(12) United States Patent
Nykerk

(10) Patent No.: US 11,002,987 B2
(45) Date of Patent: May 11, 2021

(54) FLOATING IMAGE GENERATION

(71) Applicant: Flex-N-Gate Advanced Product Development, LLC, Tecumseh (CA)

(72) Inventor: Todd Nykerk, Holland, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 13 days.

(21) Appl. No.: 16/516,604

(22) Filed: Jul. 19, 2019

(65) Prior Publication Data

US 2020/0026091 A1 Jan. 23, 2020

Related U.S. Application Data

(60) Provisional application No. 62/701,034, filed on Jul. 20, 2018.

(51) Int. Cl.
*G02B 30/56* (2020.01)
*G02B 30/27* (2020.01)
*G02B 30/35* (2020.01)

(52) U.S. Cl.
CPC ............ *G02B 30/56* (2020.01); *G02B 30/27* (2020.01); *G02B 30/35* (2020.01)

(58) Field of Classification Search
None
See application file for complete search history.

(56) References Cited

U.S. PATENT DOCUMENTS

| | | | |
|---|---|---|---|
| 9,989,920 B2 | 6/2018 | Schwerdtner | |
| 10,006,600 B2 | 6/2018 | Jo et al. | |
| 2003/0058209 A1 | 2/2003 | Balogh | |
| 2010/0007636 A1 | 1/2010 | Tomisawa et al. | |
| 2011/0234770 A1 | 9/2011 | Zerrouk et al. | |
| 2011/0304895 A1 | 12/2011 | Schwerdtner | |
| 2013/0128230 A1 | 5/2013 | Macnamara | |
| 2014/0133128 A1 | 5/2014 | Oh | |

(Continued)

FOREIGN PATENT DOCUMENTS

CN 202188326 U 4/2012
WO 2016191321 A1 12/2016

OTHER PUBLICATIONS

PCT Patent Application PCT/US2018/059750 International Search Report and Written Opinion dated Mar. 21, 2019.

(Continued)

*Primary Examiner* — Michelle M Iacoletti
*Assistant Examiner* — Danell L Owens
(74) *Attorney, Agent, or Firm* — Erise IP, P.A.

(57) ABSTRACT

A floating image apparatus includes a layer of optical films that focuses light from an original image to form a floating image outside of the floating image apparatus. A floating image generation lamp assembly includes a light source for emitting light. A first layer of optical films is aligned adjacent the light source and a second layer of optical films is aligned in parallel with the first layer of optical films. The first layer of optical films and the second layer of optical films are adapted for collectively focusing light emitted from the light source. A mask is disposed between the first layer of optical films and the second layer of optical films for filtering light emitted from the light source to provide a light pattern. The light pattern is projected to form a floating image outside the floating image generation lamp assembly.

14 Claims, 2 Drawing Sheets

(56) References Cited

U.S. PATENT DOCUMENTS

2017/0261758 A1* 9/2017 Powell .................. G02B 7/023
2017/0314759 A1* 11/2017 Nykerk .................. F21S 43/15
2018/0274745 A1 9/2018 Nykerk et al.

OTHER PUBLICATIONS

PCT Patent Application PCT/US2019/042590 International Search Report and Written Opinion dated Oct. 31, 2019.
PCT Patent Application PCT/US2019/042544 International Search Report and Written Opinion dated Oct. 31, 2019.

* cited by examiner

FLOATING IMAGE GENERATION

CROSS-REFERENCE TO RELATED APPLICATIONS

This application claims the benefit of U.S. Provisional Application No. 62/701,034 entitled "Floating Image Generation" and filed on Jul. 20, 2018, which is herein incorporated by reference in its entirety.

BACKGROUND

1. Field of the Disclosure

Embodiments of this disclosure are in the field of lighting displays. More specifically, embodiments of this disclosure provide floating images that appear in outside of a lighting display.

2. Description of the Related Art

None.

SUMMARY

In an embodiment, a floating image apparatus is provided. The floating image apparatus includes an original image that is not an interlaced image. A layer of optical films is provided that focuses light from the original image to form a floating image outside of the floating image apparatus.

In another embodiment, a floating image generation lamp assembly is provided. The floating image generation lamp assembly includes a light source for emitting light. A first layer of optical films is aligned adjacent the light source and a second layer of optical films is aligned with the first layer of optical films. The first layer of optical films and the second layer of optical films are adapted for collectively focusing light emitted from the light source. A mask is disposed between the first layer of optical films and the second layer of optical films for filtering light emitted from the light source to provide a light pattern. The light pattern is projected to form a floating image outside the floating image generation lamp assembly.

BRIEF DESCRIPTION OF THE DRAWINGS

Illustrative embodiments of the present disclosure are described in detail below with reference to the attached drawing figures, which are incorporated by reference herein and wherein.

Figure 1:
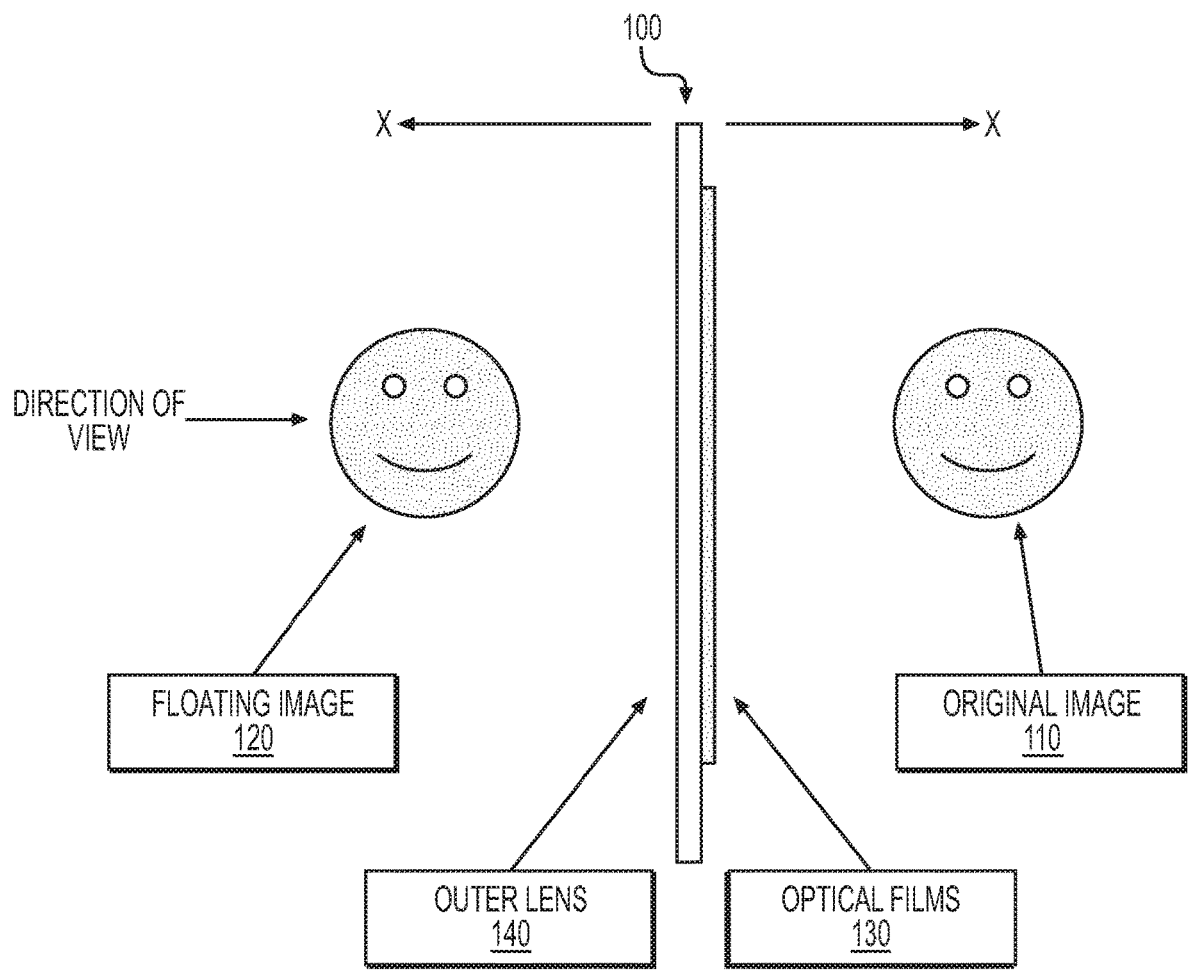
FIG. 1 shows a side view of a floating image generation apparatus, in an embodiment.

The drawing figures do not limit the invention to the specific embodiments disclosed and described herein. The drawings are not necessarily to scale, emphasis instead being placed upon clearly illustrating the principles of the disclosure.

DETAILED DESCRIPTION

In certain lighting applications, an image that appears to float in front of a display or lens may be used to create a desired visual effect. Floating images may also be referred to as three-dimensional (3D) images because they appear to have a depth that extends outside of the projecting display or lens. Traditionally, 3D images are generated using stereoscopic imaging methods involving interlaced images that are offset to one another for viewing separately by the left and right eye of a viewer. The images are then combined in the viewer's brain to give the perception of 3D depth.

Embodiments of the present disclosure provide a way to create the illusion of a floating 3D image by using a combination of focused optical films without using interlaced images.

FIG. 1 shows a side view of an exemplary floating 3D image generation apparatus 100. An original image 110 is projected by apparatus 100 to form a floating image 120. Original image 110 may include a color picture, an object, or an electronic display, for example. However, original image 110 is not an interlaced image. Original image 110 may be a lit image (e.g., an object or picture illuminated by a light source, or an illuminated electronic display). Alternatively, original image 110 may be an unlit image, and ambient light (when sufficient) may illuminate original image 110 to make floating image 120 visible.

Floating image generation apparatus 100 includes a layer of optical films 130 that focus light from original image 110 to form floating image 120. In certain embodiments, optical films 130 includes two lenticular sheets, which are optically clear sheets made of plastic with a lenticular pattern molded into one side and a flat surface on the opposite side. Specifically, individual layers of optical films 130 are arranged with their lenticular patterns aligned in the same direction and slightly offset from one another. A slight offset angle between lenticular sheets forms two separate and closely aligned optical images, one a left eye image and the other a right eye image. The right eye and the left eye of a viewer see the same image in different locations and the viewer's brain combines the two images into a 3D projection that appears to be floating outside the apparatus 100. The left and right eye images of the projected image effectively create an interlaced image despite the original image not being interlaced as with prior methods.

An optional outer lens 140 may be disposed adjacent an outer side of optical films 130 (i.e., opposite original image 110). Outer lens 140 may be made of a transparent material adapted to protect optical films 130 from outside (e.g., environmental) elements while allowing light to pass through.

In certain embodiments, apparatus 100 is integrated within a lamp assembly (e.g., of a vehicle). For example, the layer of optical films 130 and optional outer lens 140 may be structurally supported and held in alignment with one another via a housing (not shown) of the lamp assembly.

In certain embodiments, floating image 120 appears as an identical replica of original image 110 with the illusion that floating image 120 is floating or hovering in front of apparatus 100 (e.g., when viewed from the "direction of view" as indicated in FIG. 1). The direction of view may be within a range of angles based on a viewing angle of the lenticular sheets of optical films 130. The viewing angle is based upon the particular optical characteristics of the lenticular sheets. In some embodiments, floating image 120 appears as a smooth image (e.g., not grainy and without showing pixels) subject to the quality of original image 110.

The distance of floating image 120 from optical films 130 depends on a focal length from the original image 110 to the optical films 130. In some embodiments, original image 110 and floating image 120 are substantially equidistant from optical films 130, as indicated by the "X" positions shown in FIG. 1. In operation, floating image 120 produces visual effects that may be used to provide customization for lamp assemblies.

Figure 2:
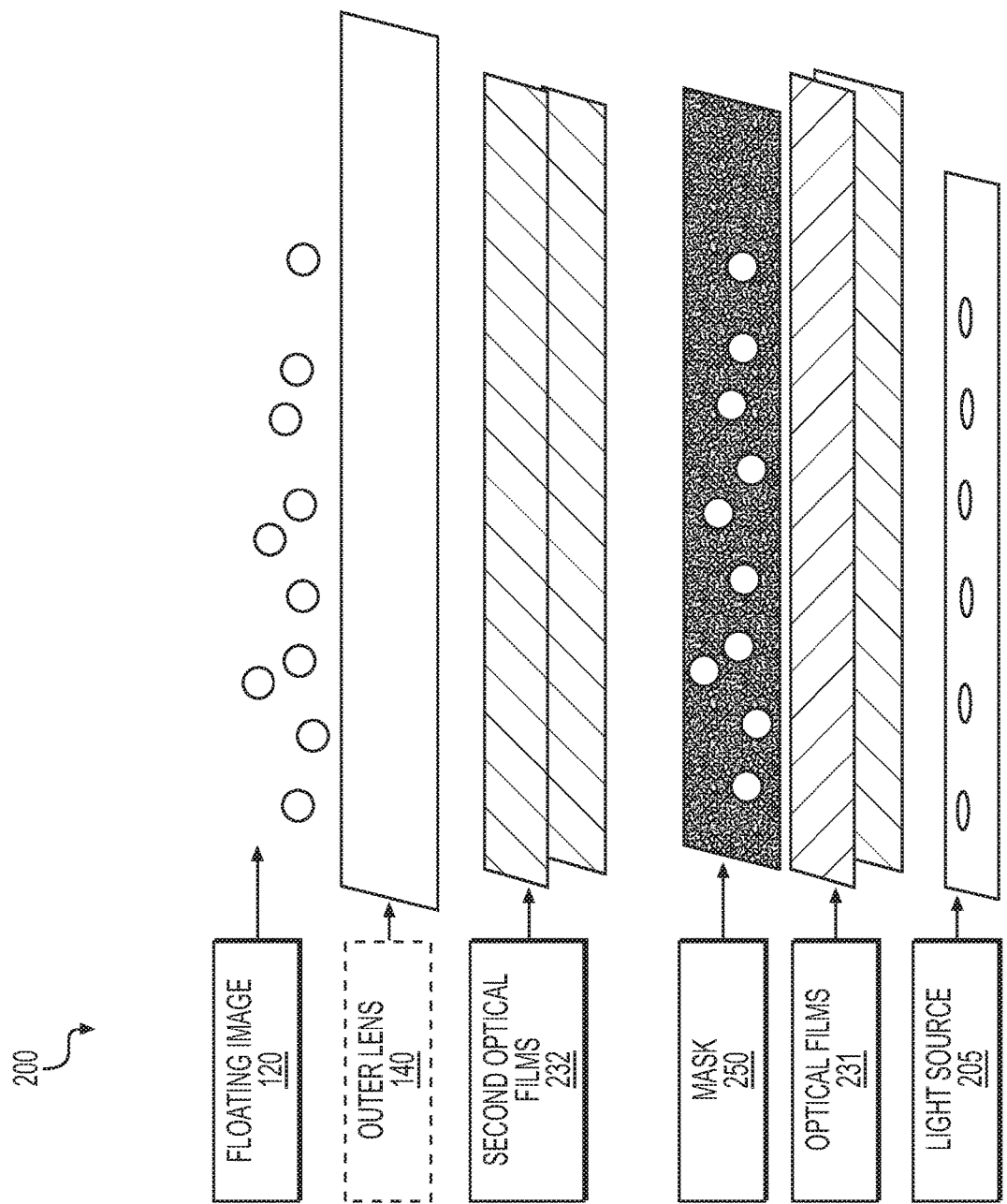
FIG. 2 shows an exploded view of another floating image generation apparatus, in an embodiment.

FIG. 2 shows an exploded view of an exemplary floating image generation apparatus 200. Apparatus 200 includes a light source 205 positioned beneath a first layer of optical films 231. In certain embodiments, light source 205 is a homogenous light source that produces a uniform and homogenous appearing light output without the appearance of hot spots. In some embodiments, light source 205 is for example a plurality of light-emitting diodes (LEDs) mounted on a printed-circuit board (PCB). Each of the LEDs may be independently lit/unlit via a controller (not shown) that is electrically and communicatively coupled with the PCB.

A mask 250 is positioned between the first layer of optical films 231 and a second layer of optical films 232. Mask 250 blocks portions of light emitted from light source 205, while allowing other portions of emitted light to pass through, thereby forming a pattern of emitted light.

First and second layer of optical films 231, 232 and mask 250 are aligned substantially parallel with one another. First and second layers of optical films 231, 232 are examples of the layer of optical films 130, FIG. 1 that are adapted to focus light from light source 205 outside of apparatus 200 (e.g., in a direction opposite light source 205). In certain embodiments, the first and second layers 231, 232 are lenticular sheets arranged with their lenticular patterns aligned and offset from one another by a slight angle. The alignment of first and second layers of optical films 231, 232 negate a natural flute spread of the optics and enable the formation of two separate but closely aligned optical images, one a left eye image and the other a right eye image. The projected image effectively creates an interlaced image despite the light pattern not being interlaced.

Optional outer lens 140 is positioned above the second layer of optical films 232. When assembled in a light assembly, light source 205, first optical films 231, mask 250, second optical films 232, and optionally outer lens 140 are positioned adjacent one another in optical alignment.

In operation, when light source 205 is lit based on the pattern of emitted light that passes through mask 250, light is focused from first and second optical film layers 231, 232, and floating images appear above outer lens 140 when viewed from a direction of view as depicted in FIG. 1 or from a viewing angle aligned within a certain limited range from the direction of view. Similar to the original image 110 of FIG. 1, the pattern of emitted light from apparatus 200 does not form an interlaced image. Instead, the projection of floating image 120 is an interlaced image despite the pattern of emitted light not being an interlaced light pattern.

Floating image generation apparatus 200 may be used to produce visual effects and provide customization of different light assemblies.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A floating image apparatus, comprising:
an original image, the original image not being an interlaced image;
a first layer of optical films having a first lenticular sheet and a second lenticular sheet, wherein the first lenticular sheet and the second lenticular sheet each have a lenticular pattern, and the first and second lenticular sheets are arranged with their respective lenticular patterns aligned in the same direction and slightly offset from one another;
a second layer of optical films having a third lenticular sheets and a fourth lenticular sheet, wherein the third lenticular sheet and the fourth lenticular sheet each have a lenticular pattern, and the third and fourth lenticular sheets are arranged with their respective lenticular patterns aligned in the same direction and slightly offset from one another;
a mask adapted to partially block light from the original image to form a light pattern, the mask being disposed between the first layer of optical films and the second layer of optical films, such that light from the original image is transformed into a plurality of floating images outside of the floating image apparatus.

2. The floating image apparatus of claim 1, wherein a slight offset angle between the first lenticular sheets and the second lenticular sheet forms two separate and closely aligned optical images, one optical image being a left eye image and the other optical image being a right eye image.

3. The floating image apparatus of claim 1, wherein the original image and the first and second layers of optical films are adapted for integration within a vehicle lamp assembly for projecting a floating image of the original image outside of the vehicle lamp assembly.

4. The floating image apparatus of claim 1, further comprising an outer lens disposed adjacent the second layer of optical films, the outer lens being made of a transparent material adapted to protect the second layer of optical films.

5. A floating image generation lamp assembly, comprising:
a light source for emitting light;
a first layer of optical films aligned adjacent the light source;
a second layer of optical films aligned with the first layer of optical films, wherein the first layer of optical films and the second layer of optical films are adapted for collectively focusing light emitted from the light source; and
a mask disposed between the first layer of optical films and the second layer of optical films, wherein the mask blocks portions of light from the light source and allows other portions of light to pass through the mask for forming a light pattern, wherein the light pattern is projected to form a plurality of partial floating images outside the floating image generation lamp assembly.

6. The floating image generation lamp assembly of claim 5, wherein the first layer of optical films, the mask, and the second layer of optical films are arranged substantially parallel with one another.

7. The floating image generation lamp assembly of claim 5, the first layer of optical films and the second layer of optical films each comprising a pair of lenticular sheets, wherein the lenticular sheets of each pair are arranged with a respective lenticular pattern aligned in the same direction and slightly offset from one another.

8. The floating image generation lamp assembly of claim 7, wherein a slight offset angle between each pair of lenticular sheets forms two separate but closely aligned optical images, one a left eye image and the other a right eye image.

9. The floating image generation lamp assembly of claim 8, wherein the left eye image and the right eye image effectively create an interlaced image despite the light pattern not being an interlaced light pattern.

10. The floating image generation lamp assembly of claim 5, wherein the first layer of optical films are aligned with the second layer of optical films for negating a natural flute spread of the first layer of optical films and the second layer of optical films.

11. The floating image generation lamp assembly of claim 5, further comprising an outer lens disposed adjacent the second layer of optical films, opposite the mask, the outer lens being made of a transparent material adapted to protect the second layer of optical films.

12. The floating image generation lamp assembly of claim 5, wherein the light source is a homogenous light source for emitting a uniform light output without any hot spots, such that the mask forms a plurality of uniform partial floating images.

13. The floating image generation lamp assembly of claim 5, wherein the light source is a plurality of light-emitting diodes, such that the mask forms a plurality of non-uniform partial floating images.

14. The floating image generation lamp assembly of claim 13, wherein the plurality of light-emitting diodes are mounted on a printed-circuit board and communicatively coupled with a controller such that each of the plurality of light-emitting diodes are independently lit and unlit under control of the controller, thereby enabling a dynamic display of the plurality of non-uniform partial floating images.

* * * * *